E. D. RICHARDSON.
FEEDER.
APPLICATION FILED OCT. 5, 1920.
1,427,640.
Patented Aug. 29, 1922.
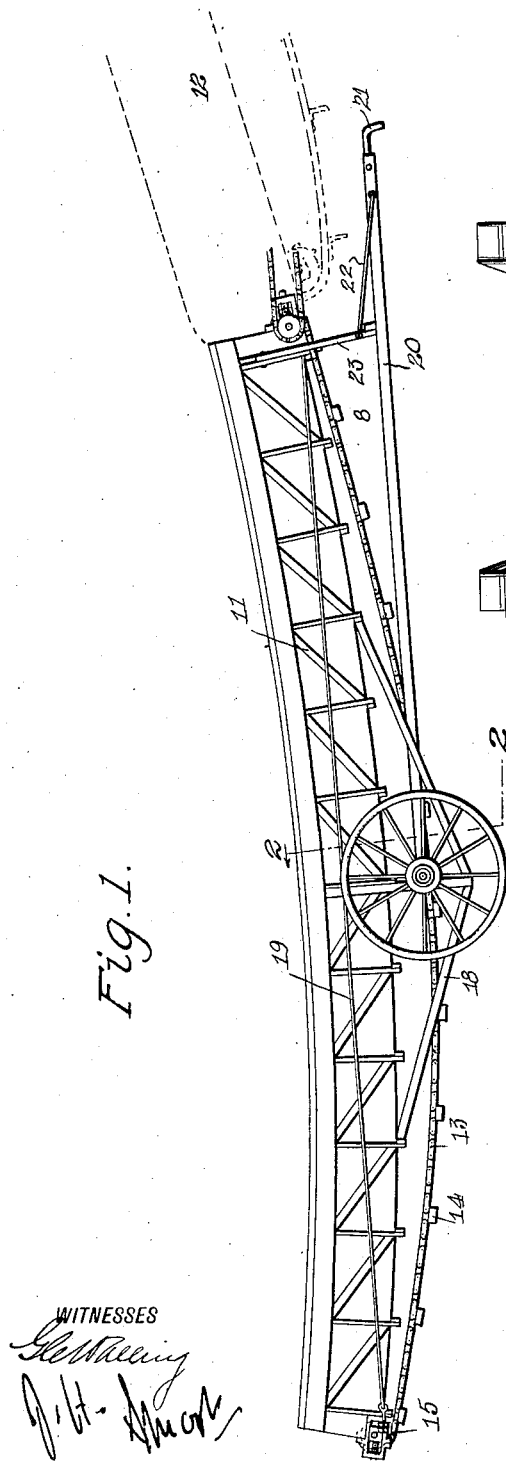
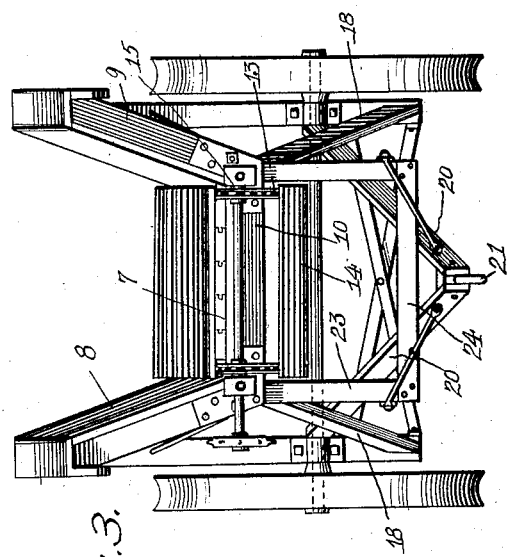
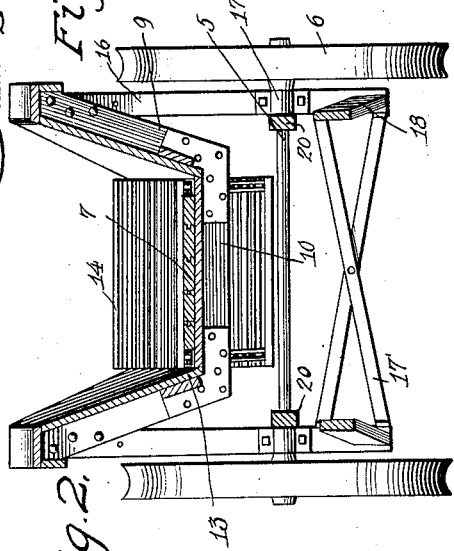
INVENTOR
E. D. Richardson

UNITED STATES PATENT OFFICE.

EMMIT D. RICHARDSON, OF CAWKER CITY, KANSAS.

FEEDER.

1,427,640.  Specification of Letters Patent.  Patented Aug. 29, 1922.

Application filed October 5, 1920. Serial No. 414,390.

*To all whom it may concern:*

Be it known that I, EMMIT D. RICHARDSON, a citizen of the United States, and resident of Cawker City, county of Mitchell, and State of Kansas, have invented a new and Improved Feeder, of which the following is a full, clear, and exact description.

In connection with threshing, it is a well appreciated fact that it has been desirable to provide what it known as a feeder, upon which the stacks were placed, and by means of which the same were fed into the threshing machine.

These feeders, however, have been, for the most part, extremely cumbersome to handle aside from the fact that devices of this nature have not proven sufficiently rugged in service to withstand the hard usage to which they were subjected for any length of time.

A further difficulty experienced has been that feeders have heretofore consisted of a body portion which was entirely straight, so that upon one end of the same being coupled to a threshing machine, the opposite end was moved to a plane at which it has been difficult to rapidly place the stacks upon the feeder.

Furthermore, due to this defect, it has been incumbent upon manufacturers of devices of this nature to manufacture the feeders with a relatively short body, so that that end of the same opposite to the end which was coupled with the threshing machine would not be moved to a plane at which it would be impractical to operate the same.

The advantage to be derived from the use of a long feeder is to be found in that numerous large stacks might be placed upon the feeder at one time without in the slightest effecting this operation.

With these defects in mind, I have constructed a feeder more particularly applicable for use in connection with a threshing machine, but which may be utilized in any desirable connection, which feeder may be materially longer than feeders heretofore placed upon the market.

A further object of my invention is the construction of a feeder in which that end of the body of the same opposite to the end which is associated with the threshing machine shall be in a plane at which the stacks may readily be placed upon the same.

A still further object of my invention is the provision of a feeder which shall be so constructed, as to be capable of withstanding the strains incident to the hard usage to which the same is subject, and in which all unwieldiness will be eliminated.

Reference is had to the attached sheet of drawings as illustrating one practical embodiment of my invention, and in which drawings, Figure 1 is a side view of a feeder constructed in accordance with my invention, and showing the same associated with the threshing machine.

Figure 2 is an enlarged sectional view taken along the line 2—2 of Figure 1, and Figure 3 is a similar front view of the feeder as illustrated in Figure 1.

In these views the reference numeral 5 indicates an axle of any suitable type, and supporting wheels 6 of any desirable construction adjacent its end portions. Mounted upon the axle 5 is the body of the feeder, it being noted, as has been clearly indicated in Figure 1, that the axle is in a position substantially intermediate the extremities of this body portion, so that the same will be readily balanced, and may consequently be transported with ease.

The body portion of the feeder includes a floor which is composed of strips of suitable wood 7, extending longitudinally throughout the entire length of the feeder for a purpose hereinafter more fully specified. Side walls 8 are provided for this floor, which side walls are of a relatively great height.

Now with a view of grouping and retaining the floor and side walls in their proper position, U-shaped braces are provided, which braces preferably include side members 9 and a base portion 10. These braces are spaced one from the other as has been indicated in Figure 1, and suitable counter braces 11 may be conveniently arranged between the same with a view of further strengthening the body portion of the feeder.

To now provide a medium whereby stacks placed within the body of the feeder will be fed to the thresher or other appliance 12, an endless conveyor is associated with the feeder, which conveyor conveniently includes a pair of endless chains 13 carrying spaced slats 14, the chain 13 moving around pulleys 15, one of which may be suitably driven by means of the thresher 12 to move the conveyor in such a manner that the slats 14 slide over the strips forming the floor 7, it being noted that the chains 13 lie in the space existent between the edges of the floor and the side walls 8.

The connection between the axle 5 and the body of the feeder is provided by utilizing a pair of uprights 16, which uprights mount bearings 17 for the axle 5. The upper end of each of the members 16 is conveniently attached to the side walls 8 at points adjacent their upper edges, but it is to be noted that the lower end of each of the uprights projects to a point below the axle 5, at which points suitable interbracing may be resorted to, as has been indicated at 17'.

Braces 18 have their ends connected respectively to the lower ends of the uprights 16, and the body of the feeder so that any strains exerted upon this body are relieved by the support, thus afforded, it being noted that a brace rod 19 conveniently extends between the ends of the feeder for further supporting the same.

Draw beams 20 have their inner ends connected to one pair of the braces 18, their opposite ends converging and terminating in a draft hook 21, its ends being further supported and braced by means of counter braces 22. The strengthening of the parts provided by this bracing is further enhanced by conveniently utilizing a further pair of uprights 23, which extend from a point adjacent the forward end of the body of the feeder to the draft beams 20, a cross piece 24 being conveniently utilized to further strengthen these parts.

Referring more particularly to Figure 1, it will be noted that the body of the feeder is curved throughout its entire length, and it will thus be appreciated, assuming as has been indicated, that the forward end of the feeder is moved to a position in which it aligns with the thresher 12, that the lower end of the same will be far above the ground, which is to be desired, and which would not be the case were the body of the feeder straight. Further, due to this curvature, a greater length is provided so that longer stacks are capable of accommodation upon the feeder, irrespective of the fact that the total length of the feeder may be virtually half the length of the conventional feeder, due to this curved construction, which as heretofore stated, prevents the free end of the feeder from lying in a position adjacent the ground.

It will also be noted that a feeder constructed in accordance with my invention may readily be transported in that the body of the same is balanced, and so spaced as to be capable of withstanding undue and severe strains. Finally, by virtue of the plurality of strips of wood extending longitudinally throughout the entire length of the feeder, and the arrangement of the slats 14 upon the same, an even wearing of all of the parts will be insured, so that a maximum of use may be afforded by constructing a feeder in accordance with my invention.

Obviously, numerous modifications of structure might readily be resorted to without in the least departing from the spirit of my invention, which I claim as:

A feeder, including a body portion, an axle, wheels attached to the outer ends of said axle, uprights extending between and engaging said body portion and axle respectively and extending below the latter, braces extending between the lower ends of the uprights and the body portion of the feeder, draw beams extending from certain of said uprights beyond one end of the body portion of said feeder, and counter braces extending between the body of said feeder to a point adjacent the outer ends of said draw beams.

EMMIT D. RICHARDSON.